(12) United States Patent
Nijjar

(10) Patent No.: US 9,529,977 B1
(45) Date of Patent: Dec. 27, 2016

(54) SYSTEMS AND METHODS FOR PERFORMING DATA-LOSS-PREVENTION SCANS

(75) Inventor: Manjinder Nijjar, Maharashtra (IN)

(73) Assignee: Symantec Corporation, Mountain View, CA (US)

(*) Notice: Subject to any disclaimer, the term of this patent is extended or adjusted under 35 U.S.C. 154(b) by 1674 days.

(21) Appl. No.: 12/533,857

(22) Filed: Jul. 31, 2009

(51) Int. Cl.
*G06F 21/00* (2013.01)

(52) U.S. Cl.
CPC .................................... *G06F 21/00* (2013.01)

(58) Field of Classification Search
CPC ...... H04L 63/20; G06F 21/552; G06F 21/577; G06F 21/21; G06F 19/322; G06F 2221/2101; G06F 21/00
USPC .................................... 726/1, 22, 23, 24, 25
See application file for complete search history.

(56) References Cited

U.S. PATENT DOCUMENTS

| | | | |
|---|---|---|---|
| 7,937,761 B1* | 5/2011 | Bennett | 726/23 |
| 7,971,258 B1* | 6/2011 | Liao et al. | 726/24 |
| 7,996,373 B1* | 8/2011 | Zoppas et al. | 707/694 |
| 8,065,730 B1* | 11/2011 | Sobel et al. | 726/22 |
| 2009/0217381 A1* | 8/2009 | Helman et al. | 726/25 |
| 2009/0328222 A1* | 12/2009 | Helman et al. | 726/25 |
| 2010/0024037 A1* | 1/2010 | Grzymala-Busse et al. | 726/26 |
| 2010/0083346 A1* | 4/2010 | Forman | G06F 21/55 726/1 |
| 2010/0162347 A1* | 6/2010 | Barile | 726/1 |
| 2011/0040983 A1* | 2/2011 | Grzymala-Busse | G06F 21/6245 713/189 |

* cited by examiner

*Primary Examiner* — Tamara T Kyle
(74) *Attorney, Agent, or Firm* — FisherBroyles, LLP

(57) ABSTRACT

A computer-implemented method for performing data-loss-prevention scans may include identifying a subset of data-storage locations on a first computing system that are likely to contain sensitive information. The method may also include performing a quick scan on the first computing system by scanning the subset of data-storage locations that are likely to contain sensitive data and excluding other locations from the quick scan. The method may further include identifying sensitive data during the quick scan and applying a data-loss-prevention policy to the sensitive data. Various other methods, systems, and computer-readable media are also disclosed.

20 Claims, 5 Drawing Sheets

SYSTEMS AND METHODS FOR PERFORMING DATA-LOSS-PREVENTION SCANS

BACKGROUND

The modern enterprise is a veritable ocean of unmanaged information. Despite many years and many dollars invested in gaining some control over the massive volumes of content generated by employees, customers, and business operations, few organizations have a clear idea where their sensitive information is located or how it is secured. While some content happens to reside in protected servers, document management systems, and databases, far more is scattered across email files, endpoints, and completely unknown file shares. Enterprises are at risk of compliance violations, insider abuse, and external attacks—not because they cannot protect their sensitive data in known locations, but because they have very little understanding of where the content is actually located, how it is protected, and how it is being used. One of the most promising techniques to help reduce this risk is known as Data Loss Prevention ("DLP"). While DLP involves monitoring data in motion (i.e., monitoring network traffic), DLP tools are also used to protect data at rest (i.e., performing DLP scans of network devices).

Conventional DLP solutions may perform periodic full scans of network devices to discover sensitive data. Unfortunately, full DLP scans may be time and resource intensive. Thus, organizations may only schedule full DLP scans of endpoint devices at infrequent intervals, leaving the possibility that sensitive data may not be discovered on a network device for an extended period of time. Failure to discover sensitive data in a timely manner results in increased risk of data loss.

SUMMARY

As will be described in greater detail below, the instant disclosure generally relates to systems and methods for performing data-loss-prevention scans. In some embodiments, a method may include identifying a subset of data-storage locations on a first computing system that are likely to contain sensitive information. The method may also include performing a quick scan on the first computing system by scanning the subset of data-storage locations that are likely to contain sensitive data and excluding other locations from the quick scan. The method may further include identifying sensitive data during the quick scan and applying a data-loss-prevention policy to the sensitive data.

In certain embodiments, identifying the subset of data-storage locations may include identifying a directory to which an application saves potentially sensitive information. According to at least one embodiment, the directory may be a default directory to which the application automatically saves data. In some embodiments, the application may include an email client and the directory to which the application saves potentially sensitive information may be a directory to which the email client automatically saves email attachments. Alternatively, the application may be an Internet browser and the directory to which the application saves potentially sensitive information may be a directory to which the Internet browser automatically saves downloads.

In some embodiments, identifying the subset of data-storage locations may include identifying a network share. Additionally or alternatively, identifying the subset of data-storage locations may include: performing a full data-loss-prevention scan on the first computing system to identify sensitive information on the first computing system; identifying, based on a result of the full data-loss-prevention scan, at least one location that includes sensitive information; and including the at least one location in the subset of data-storage locations that are likely to contain sensitive information.

In some embodiments, performing the full data-loss-prevention scan may include performing a plurality of full data-loss prevention scans. In such embodiments, identifying the at least one location that includes sensitive information may include determining, based on results of the plurality of full data-loss prevention scans, a probability that the at least one location includes sensitive information.

In some embodiments, the method may further include performing a quick scan on a second computing system by: (1) scanning a subset of data-storage locations on the second computing system that correspond to the subset of data-storage locations on the first computing system that are likely to contain sensitive data and (2) excluding other locations from the quick scan of the second computing system.

In some embodiments, a system may include at least one processor, an identification module programmed to direct the processor to identify a subset of data-storage locations on a first computing system that are likely to contain sensitive information, a scanning module programmed to perform a quick scan on the first computing system by scanning the subset of data-storage locations that are likely to contain sensitive data and excluding other locations from the quick scan and identify sensitive data during the quick scan, and a data-loss-prevention module programmed to apply a data-loss-prevention policy to the sensitive data.

In certain embodiments, the identification module may be programmed to identify the subset of data-storage locations by identifying a directory to which an application saves potentially sensitive information and/or the directory may be a default directory to which the application automatically saves data. In some embodiments, the application may be an email client and the directory to which the application saves potentially sensitive information may be a directory to which the email client automatically saves email attachments. Alternatively, the application may be an Internet browser and the directory to which the application saves potentially sensitive information may be a directory to which the Internet browser automatically saves downloads.

In various embodiments, the identification module may be programmed to identify the subset of data-storage locations by identifying a network share. Additionally or alternatively, the identification module may be programmed to identify the subset of data-storage locations by performing a full data-loss-prevention scan on the first computing system to identify sensitive information on the first computing system, by identifying, based on a result of the full data-loss-prevention scan, at least one location that includes sensitive information, and by including the at least one location in the subset of data-storage locations that are likely to contain sensitive information.

According to certain embodiments, a computer-readable-storage medium comprising one or more computer-executable instructions that, when executed by a computing device, may cause the computing device to identify a subset of data-storage locations on a first computing system that are likely to contain sensitive information, perform a quick scan on the first computing system by scanning the subset of data-storage locations that are likely to contain sensitive data and excluding other locations from the quick scan, identify sensitive data during the quick scan, and/or apply a data-loss-prevention policy to the sensitive data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
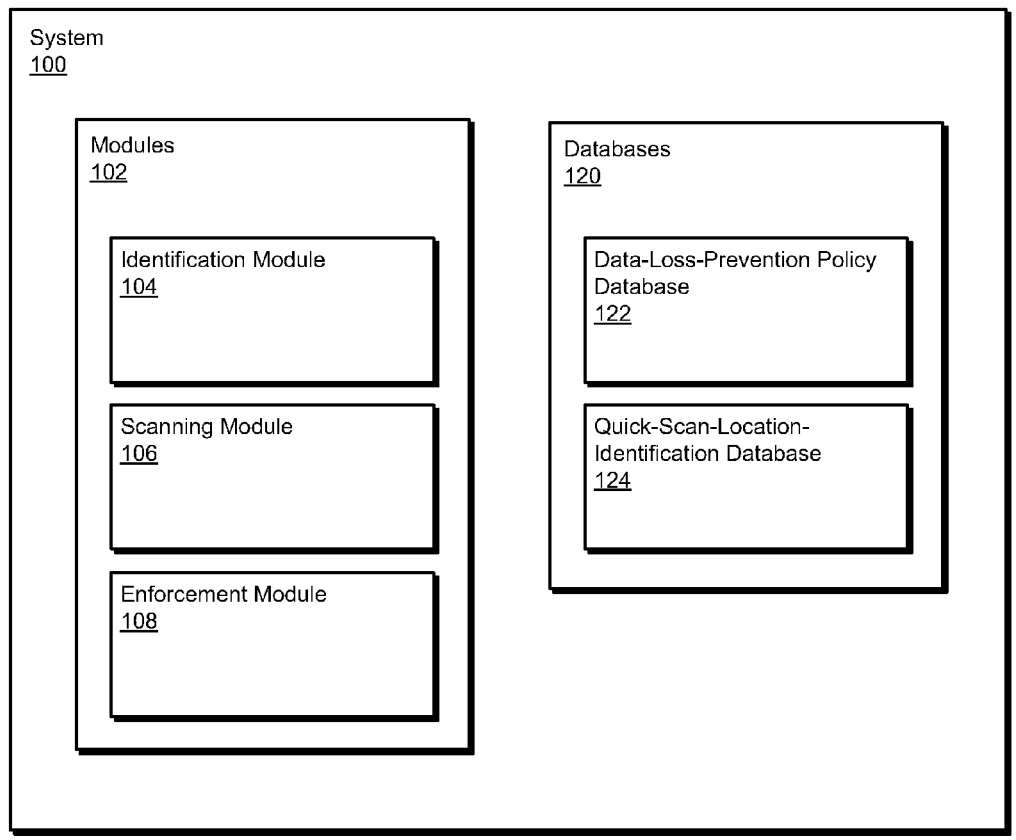
FIG. 1 is a block diagram of an exemplary system for performing data-loss-prevention scans.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for performing data-loss-prevention scans. Embodiments of the instant disclosure may identify locations that are more likely to contain sensitive data than others and only scan the locations that are likely to contain sensitive data. Locations that are likely to include sensitive data include application directories (e.g., browser download directories, email attachment directories, etc.) and network shares. In some embodiments, information gathered from past scans may be used to identify locations that are likely to include sensitive information. Various other locations may also be identified as being likely to contain sensitive information. Embodiments of the instant disclosure may perform quick scans of the locations that are likely to contain sensitive information to more quickly and efficiently locate sensitive information on a computing system.

As used herein, the phrases "sensitive information" and "sensitive data" are used interchangeably to refer to any information protected by a data-loss-prevention policy. Sensitive information may include financial information, customer information, pricing information, product design information, trade-secret information, confidential information, privileged information, and/or any other type of information that an organization may want to protect. Sensitive information may be stored in data files, executable files, file segments or other portions of files, database entries, one/or more segments of executable code, and/or any other data storage structure.

Figure 2:
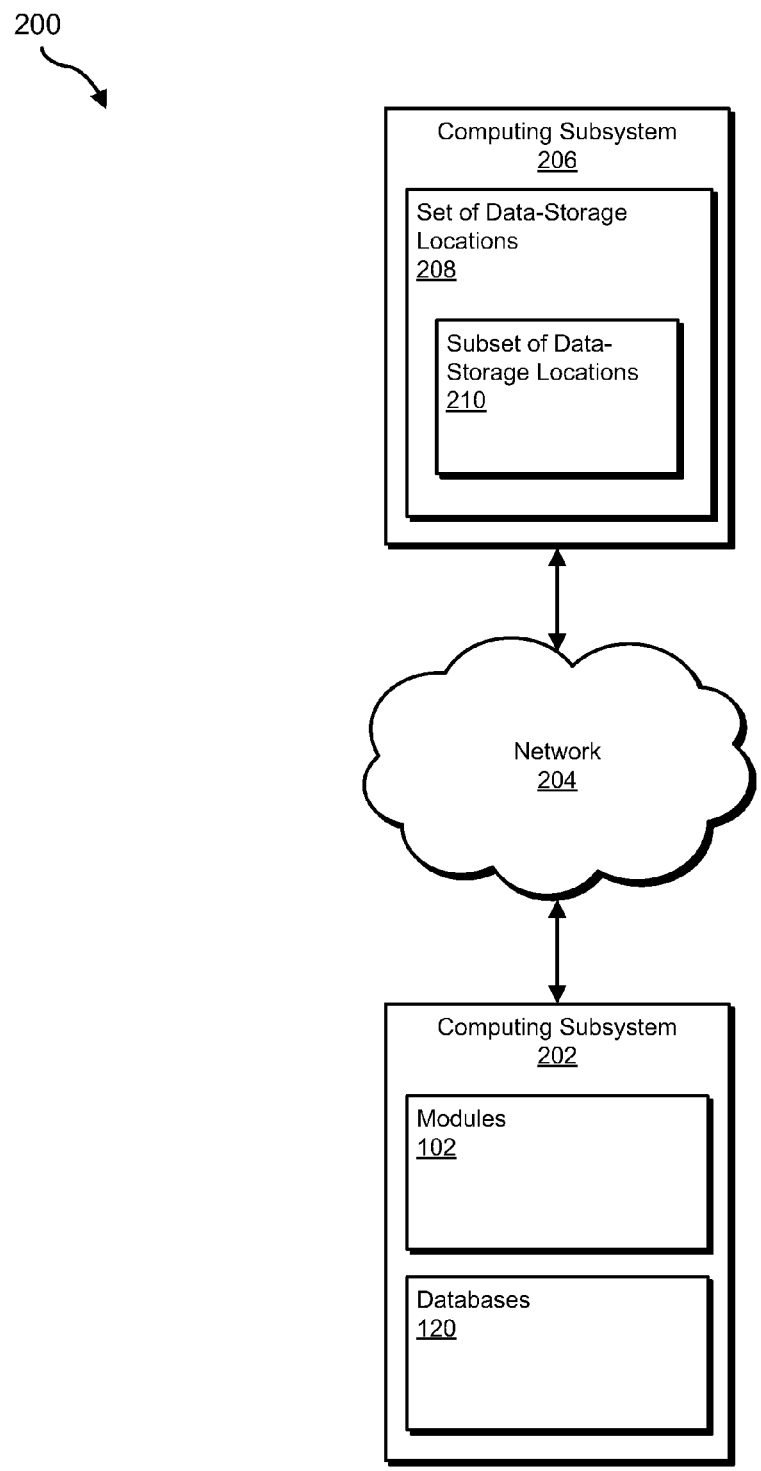
FIG. 2 is a block diagram of another exemplary system for performing data-loss-prevention scans.

The following will provide, with reference to FIGS. 1 and 2, detailed descriptions of exemplary systems for performing data-loss-prevention scans. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for performing data-loss-prevention scans. As illustrated in this figure, exemplary system 100 may include one or more modules 102 for performing one or more tasks. For example, and as will be explained in greater detail below, exemplary system 100 may include an identification module 104 programmed to identify a subset of data-storage locations on a first computing system that are likely to contain sensitive information. Exemplary system 100 may also include a scanning module 106 programmed to perform a quick scan on the first computing system by scanning the subset of data-storage locations that are likely to contain sensitive data and excluding other locations from the quick scan. Scanning module 106 may also be programmed to identify sensitive data during the quick scan.

In addition, and as will be described in greater detail below, exemplary system 100 may include an enforcement module 108 programmed to apply a data-loss-prevention policy to sensitive data identified during a scan. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing subsystem 202 and/or computing subsystem 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a data-loss-prevention policy database 122 for storing data-loss-prevention policies. Exemplary system 100 may also include a quick-scan-location-identification database 124 for storing identification information of locations that are likely to contain sensitive data.

Databases 120 in FIG. 1 may represent a portion of one or more computing devices. For example, databases 120 may represent a portion of computing subsystem 202 in FIG. 2, computing system 410 in FIG. 4, and/or portions of exemplary network architecture 500 in FIG. 5. Alternatively, databases 120 in FIG. 1 may represent one or more physically separate devices capable of being accessed by a computing device, such as computing subsystem 202 in FIG. 2 computing system 410 in FIG. 4 and/or portions of exemplary network architecture 500 in FIG. 5.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing subsystem 202 in communication with a computing subsystem 206 via a network 204. Computing subsystem 202 may include modules 102 and databases 120, and computing subsystem 206 may include a set of data-storage locations 208 and a subset of data-storage locations 210. Set of data-storage locations 208 may include all storage locations in computing subsystem 206. Alternatively, set of data-storage locations 208 may include a set of storage locations that is less than all storage locations in computing subsystem 206. For example, set of data-storage locations 208 may include all storage locations in a particular directory tree, volume, or storage device. Subset of data-storage locations 210 may include a subset of the storage locations in set of data-storage locations 208. Subset of data-storage locations 210 may include one or more storage locations.

In some embodiments, computing subsystem 202 may represent a data-loss-prevention server and computing subsystem 206 may represent an end-point device scanned and/or protected by the data-loss-prevention server. While FIG. 2 shows modules 102 and databases 120 on computing subsystem 202, one or more of modules 102 and/or databases 120 may be located on computing subsystem 206.

Computing subsystems 202 and 206 generally represent any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 410 in FIG. 4, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 500 in FIG. 5, or the like. Network 204 may facilitate communication or data transfer using wireless or wired connections. In one embodiment, network 204 may facilitate communication between computing subsystems 202 and 206.

Figure 3:
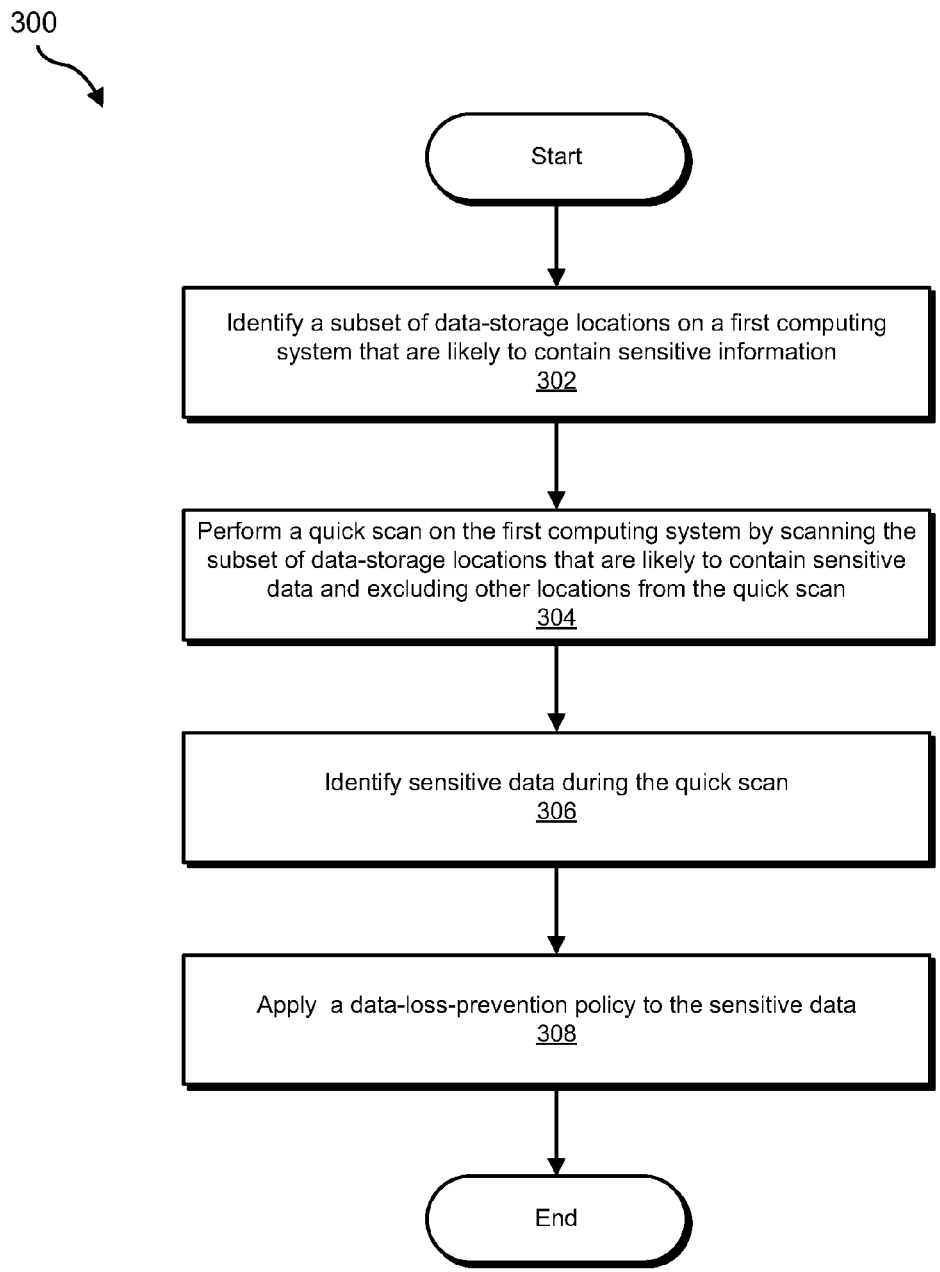
FIG. 3 is a flow diagram of an exemplary method for performing data-loss-prevention scans.

FIG. 3 is a flow diagram of an exemplary computer-implemented method 300 for performing data-loss-prevention scans. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. For example, at step 302 identification module 104 may, as part of computing subsystem 202, identify a subset of data-storage locations on a first computing system that are likely to contain sensitive information.

As used herein, the phrase "locations that are likely to contain sensitive information" generally refers to one or more files, folders, or other data objects or storage entities on a computing system that are more likely to contain sensitive information than at least one other location (i.e., file, folder, or other data object or storage entity) on the computing system. Thus, the subset of data-storage locations identified in step 302 may be more likely to contain sensitive information than storage locations that are excluded from the set of data-storage locations identified in step 302.

Identification module 104 may identify one or more locations that are likely to contain sensitive information in a variety of manners. In some embodiments, identification module 104 may identify locations that are likely to contain sensitive information by identifying a directory to which an application saves potentially sensitive information. For example, identification module 104 may identify a default directory to which an application automatically saves data. Identification module 104 may identify directories of various types of applications, including email client applications, instant messaging applications, Internet browser applications, word processing applications, spreadsheet applications, and/or any other type of application that may be used to create, transmit, receive, edit, view and/or otherwise access sensitive information. Identification module 104 may identify any type of directory associated with one or more of these applications. Such directories may be default directories used by an application and/or user-defined directories.

As an example, identification module 104 may identify a directory to which an email client automatically saves email attachments. Since sensitive information is often transmitted via email, a directory that stores email attachments (and/or any other directory associated with an email client) may be a location that is likely to contain sensitive information. As another example, identification module 104 may identify a directory to which an internet browser automatically saves downloads. As a third example, identification module 104 may identify a directory that stores data of a financial application (e.g., a directory that stores a QUICKBOOKS file).

In addition to, or instead of, identifying directories that may store sensitive information, identification module 104 may identify one or more network shares as locations that are likely to contain sensitive information. As used herein, the phrase "network share" may generally refer to any shared resource. A network share may include any device or directory on a computing system that may be remotely accessed from another computing system. For example, a network share on a local computing system may be accessed by a remote computing system via a local area network, the Internet, and/or any other network. The remote computing system may access the network share as if the network share were a resource on the remote computing system.

In some embodiments, identification module 104 may use a subset of data-storage locations that are likely to contain sensitive information identified on a first system to identify similar locations on a second system. Identification module 104 may store identification information of sensitive locations of a first computing system in quick-scan-location identification database 124. Scanning module 106 may then use the information to scan a subset of data-storage locations on a second computing system that correspond to the subset of data-storage locations on the first computing system that are likely to contain sensitive data.

Identification module 104 may use any heuristic or algorithm to analyze one or more previous scans (full scans and/or quick scans). For example, if a previous full scan identifies a location that contains sensitive information, identification module 104 may include that location in the subset of locations that are likely to contain sensitive information. As another example, if a particular location, such as a directory, is identified as containing sensitive information a predetermined number of times (e.g., if the location is identified as containing sensitive information in a predetermined number of previous scans), identification module 104 may include the location in the subset of locations that are likely to contain sensitive information. As a third example, identification module 104 may use information from one or more previous data-loss-prevention scans to determine a probability that a location contains sensitive information. In such embodiments, if the probability is above a predetermined threshold, identification module 104 may include the location in the subset of locations that are likely to contain sensitive information.

By using past scans to identify locations that contain sensitive information, embodiments of the instant disclosure may identify locations that a user may be attempting to hide and/or to which a user inadvertently stores sensitive information (e.g., a novice user may store sensitive information in a hidden file or specific folder).

As used herein, the phrase "full scan" refers to a data-loss-prevention scan of each location in a set of locations. As previously noted, a set of locations may include each location in a computing system and/or any set of locations in a computing system that includes less than all locations in the computing system. The phrase "quick scan" generally refers to a data-loss-prevention scan that scans less than all of the locations in the set of locations scanned by a full scan.

Returning to FIG. 3, at step 304 scanning module 106 may perform a quick scan on the first computing system by scanning the subset of data-storage locations that are likely to contain sensitive data and excluding other locations from the quick scan (i.e., not scanning the other locations). Scanning module 106 may scan the subset of data-storage locations using any suitable scanning techniques and/or technologies.

In some embodiments, data storage locations may be scanned remotely. For example, a central policy server or a dedicated scanning server may include scanning module 106 and may access storage repositories via network shares or other administrative access. Connections are often made using administrative credentials, and any content transferred may be encrypted, which may involve reconfiguration of the storage repository. Scanning servers may use bandwidth throttling to limit network impact and may be placed close to the storage being scanned to increase speed and limit network impact.

Additionally or alternatively, scanning module 106 may be a lightweight agent installed on an endpoint and may scan content locally. In such embodiments, scanning module 106 may send results of a scan to a central management server. In other embodiments, scanning module 106 may be installed on an endpoint as a full agent that includes local discovery capabilities. Full agents may provide various data-loss-prevention functions, such as USB monitoring and/or blocking. Alternatively, scanning module 106 may be implemented through direct integration with document management, content management, or other storage repositories. Such integration may support visibility into management content and may allow scanning module 106 to understand local context and possibly enforce actions within the system.

As noted in step 304, scanning module 106 may exclude from a quick scan locations that are not in the subset of data-storage locations identified in step 302. For example, scanning module 106 may exclude all locations in set of data-storage locations 208 that are not in subset of data-storage locations 210. Scanning module 106 may exclude locations by not scanning the locations in the quick scan.

Returning to FIG. 3, at step 306 scanning module 106 may identify sensitive data during the quick scan. Scanning module 106 may use one or more data-loss-prevention rules to identify sensitive data during a quick scan. As used herein, the phrase "data-loss-prevention rule" may refer to a rule that describes, defines, or otherwise identifies content that an organization desires to protect (i.e., sensitive data). A data-loss-prevention rule may be configured in a variety of formats or configurations. For example, data-loss-prevention rules may include signatures, such as hashes, of sensitive data. Additionally or alternatively, a data-loss-prevention rule may include the sensitive data itself. In some embodiments, a data-loss-prevention rule may include one or more entries in a database or list. For example, each row of customer data in a customer data list may comprise a data-loss-prevention rule. As another example, each product-pricing entry in a product database may comprise a data-loss-prevention rule. Alternatively, a single data-loss-prevention rule may include a set of database entries or other data entries.

A data-loss-prevention rule may apply to the content of one or more data objects. As used herein, the phrase "data object" may refer to any form or type of data entity or digital information. For example, data objects may include data files, executable files, file segments or other portions of files, database entries, one or more segments of executable code, financial information, customer information, pricing information, product design information, trade-secret information, confidential information, privileged information and/or any other file or information.

In addition to identifying content of a data object, a data-loss-prevention rule may also identify other attributes of the data object. For example, a data-loss-prevention rule may identify a data object name, a data object creation date, a data object modification date, a location where the data object is stored, a size of the data object, and/or any other attribute of the data object. A data-loss-prevention rule may additionally or alternatively identify other contextual information associated with a data object. For example, a data-loss-prevention rule may identify to whom a data object is being sent, from whom a data object is being sent, a destination location of a data object, and/or any other contextual information associated with a data object.

Scanning module 106 may apply a data-loss-prevention rule and/or a set of data-loss-prevention rules to a data object by comparing data identified in the rules with data in the data object. For example, if the rules comprise a signature of sensitive information, scanning module 106 may compare the signature with a signature generated for data in the data object to determine whether the data object includes the sensitive information. As another example, scanning module 106 may apply a data-loss-prevention rule by directly (i.e., without calculating signatures) comparing the data-loss-prevention rule with data in the data object.

Scanning module 106 may apply a data-loss-prevention rule to a data object by determining whether the data object has an attribute identified by the data-loss-prevention rule. For example, if the data-loss-prevention rule identifies a file name, scanning module 106 may determine whether the data object has the same name. As another example, if the data-loss-prevention rule identifies an email sender, scanning module 106 may determine whether the data object is being sent in an email from the email sender.

After scanning module 106 identifies sensitive data, at step 308, enforcement module 108 may apply a data-loss-prevention policy to the sensitive data. As used herein, the phrase "data-loss-prevention policy" may refer to any policy that defines how sensitive data should be handled. For example, a data-loss-prevention policy may define when to create security alerts, use on-screen notifications to educate employees on data security policies, protect sensitive data from being stored in unauthorized places, remove sensitive data from unsecure locations, and/or perform any other data security function.

Embodiments of the instant disclosure may provide various features and advantages not provided by tradition data-loss-prevention systems. For example, embodiments of the instant disclosure may automatically (i.e., without administrator or other user input) identify locations where sensitive information is likely to be stored. Furthermore, embodiments of the instant disclosure may use information gathered one endpoint device to identify locations that may contain sensitive information on other similar computing devices.

The quick scans disclosed herein may be more efficient than full scans. Thus, administrators may schedule quick scans more frequently than full scans. For example, an administrator may schedule a quick scan to run during lunch breaks in an organization. Quick scans may also be scheduled at various other times and/or intervals.

Figure 4:
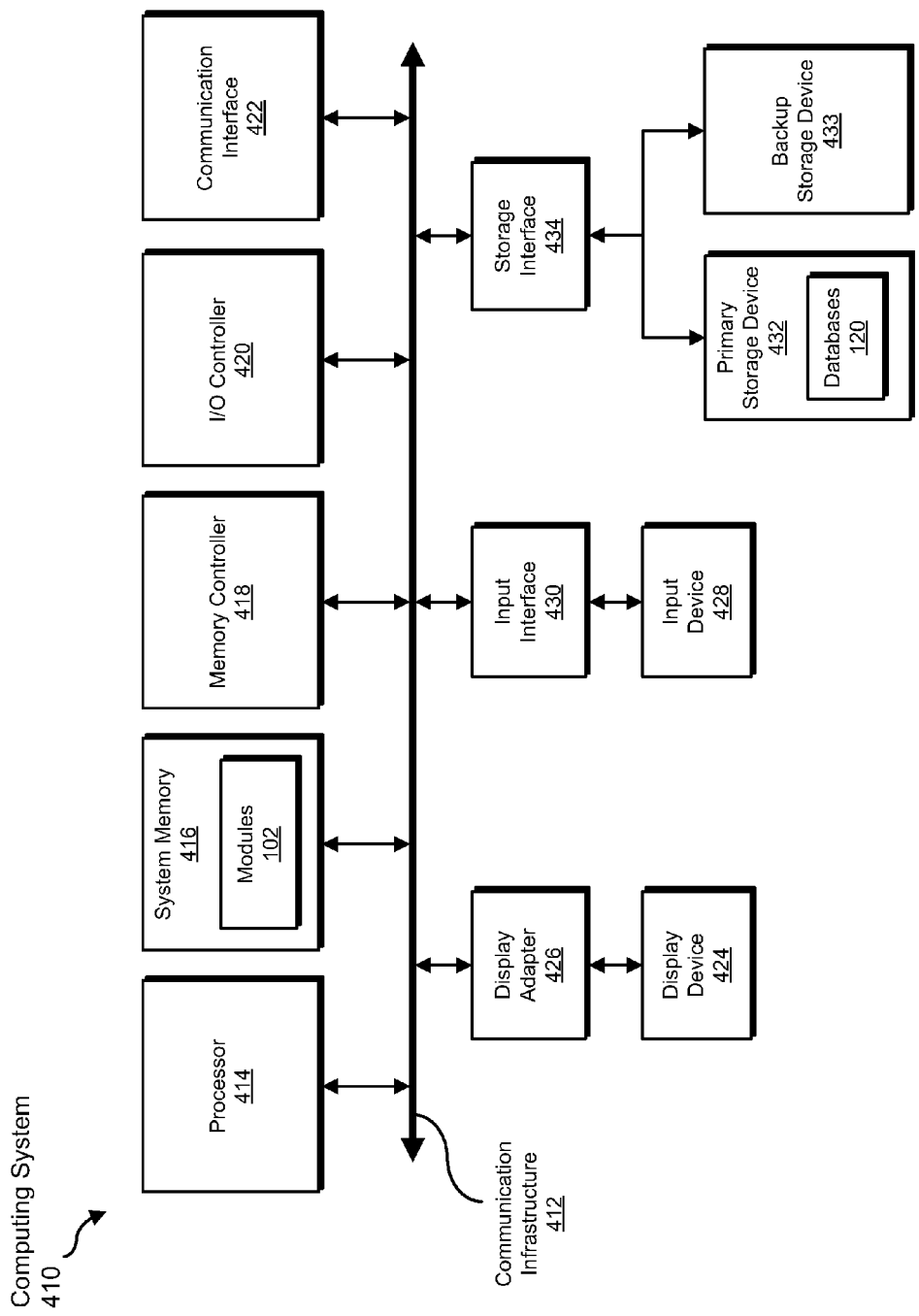
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the identifying, performing, and/or applying steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as identifying, performing, and/or applying.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the identifying, performing, and/or applying steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the identifying, performing, and/or applying steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the identifying, performing, and/or applying steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. In one example, databases 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the identifying, performing, and/or applying steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
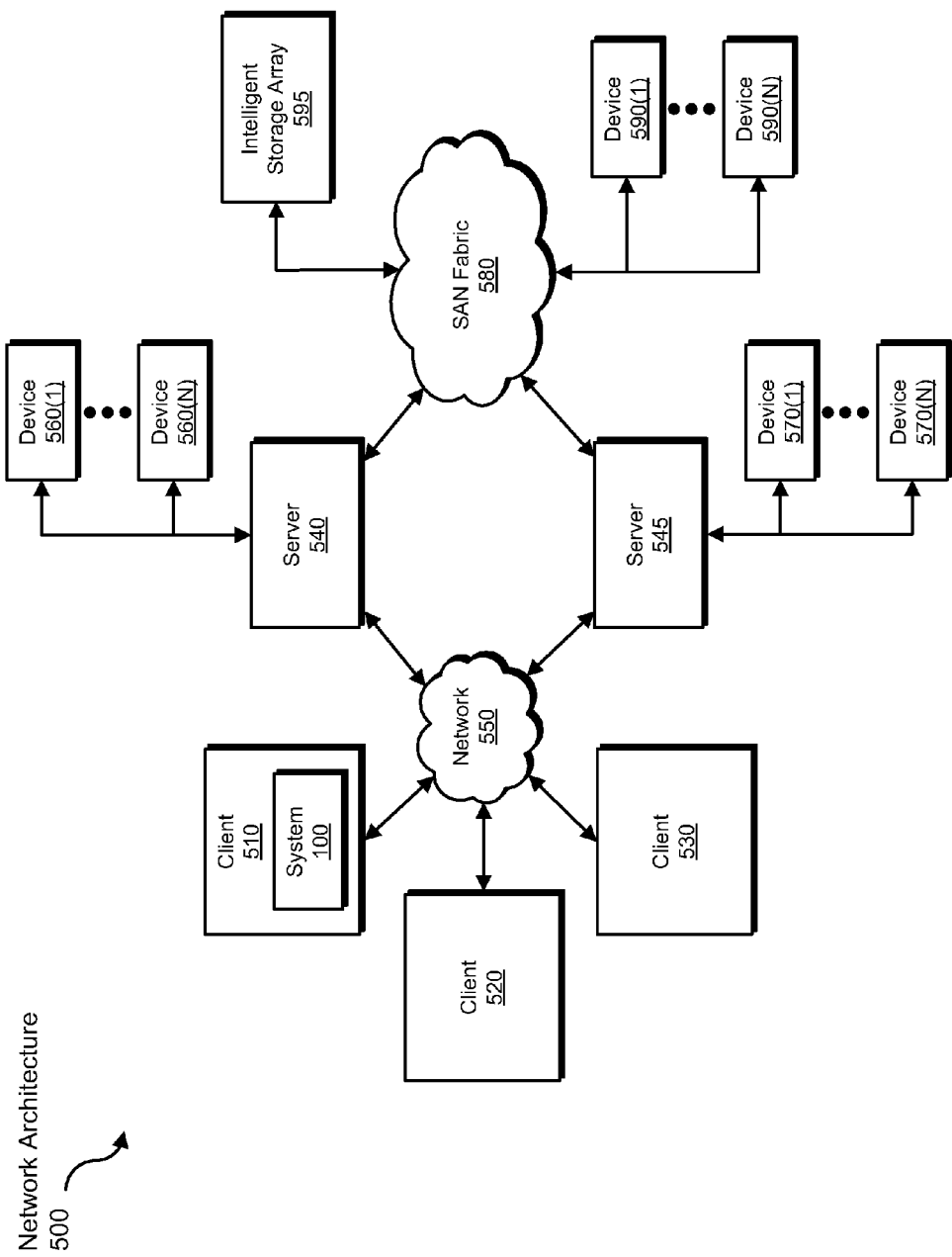
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. In one example, client system 510 may include system 100 from FIG. 1.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the identifying, performing, and/or applying steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for performing data-loss-prevention scans.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned, from, and/or to a cloud computing environment and/or one or more of modules 102 may operate in a cloud computing environment.

One or more of the software modules described herein may transform data, physical devices, and/or representations of physical devices from one form to another. For example, enforcement module 106 may transform a storage device by removing sensitive information from the storage device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing data-loss-prevention scans, at least a portion of the method being performed by a computing device comprising at least one processor, the method comprising:
identifying a subset of data-storage locations on a first computing system that are likely to contain sensitive information;
performing a quick scan on the first computing system by scanning the subset of data-storage locations on the first computing system that are likely to contain sensitive information and not scanning other locations on the first computing system;
identifying a location comprising sensitive data during the quick scan of the first computing system;
determining, based on an analysis of a plurality of previous scans including the quick scan, that the location has been identified as containing sensitive information in a predetermined number of the previous scans;
based on the determination, adding identification information of the sensitive location to a quick-scan-location identification database that stores identification information of sensitive locations of the first computing system;
scheduling a quick scan to run at regular intervals on a second computing system, wherein running the quick scan of the second computer comprises:
scanning a subset of the data-storage locations on the second computing system corresponding to the sensitive locations included in the quick-scan-location identification database;
excluding, from the quick scan of the second computing system, a subset of data-storage locations corresponding to data-storage locations that are not included in the quick-scan-location identification database.

2. The method of claim 1, wherein identifying the subset of data-storage locations on the first computing system that are likely to contain sensitive information comprises identifying a directory to which an application saves potentially sensitive information.

3. The method of claim 2, wherein the directory is a default directory to which the application automatically saves data.

4. The method of claim 2, wherein:
the application comprises an email client;
the directory to which the application saves potentially sensitive information is a directory to which the email client automatically saves email attachments.

5. The method of claim 2, wherein:
the application comprises an internet browser;
the directory to which the application saves potentially sensitive information is a directory to which the internet browser automatically saves downloads.

6. The method of claim 1, wherein identifying the subset of data-storage locations on the first computing system comprises:
using information from one or more scans that were run prior to the quick scan on the first computing device to determine a probability that a particular location within the subset of data-storage locations on the first computing system contains sensitive information;
determining that the probability is above a predetermined threshold.

7. The method of claim 1, wherein identifying the subset of data-storage locations on the first computing system comprises:
performing a full data-loss-prevention scan on the first computing system to identify sensitive information on the first computing system;
identifying, based on the result of the full data-loss-prevention scan, the subset of data-storage locations on the first computing system that are likely to contain sensitive information.

8. The method of claim 7, wherein performing the full data-loss-prevention scan comprises performing a plurality of full data-loss prevention scans.

9. The method of claim 1, wherein identifying the subset of data-storage locations on the first computing system comprising identifying a network share that is likely to contain sensitive information.

10. A system comprising:
at least one processor;
an identification module programmed to direct the processor to identify a subset of data-storage locations on a first computing system that are likely to contain sensitive information;
a scanning module programmed to:
perform a quick scan on the first computing system by scanning the subset of data-storage locations on the first computing system that are likely to contain sensitive information and excluding other locations on the first computing system from the quick scan;
identify a location comprising sensitive data during the quick scan of the first computing system;
determine, based on an analysis of a plurality of previous scans including the quick scan, that the location has been identified as containing sensitive information in a predetermined number of the previous scans;
based on the determination, add identification information of the sensitive location to a quick-scan-location identification database that stores identification information of sensitive locations of the first computing system;
schedule a quick scan to run at regular intervals on a second computing system, wherein running the quick scan of the second computer comprises:
scanning a subset of the data-storage locations on the second computing system corresponding to the sensitive locations included in the quick-scan-location identification database;
excluding, from the quick scan of the second computing system, a subset of data-storage locations corresponding to data-storage locations that are not included in the quick-scan-location identification database;
a data-loss-prevention module programmed to apply a data-loss-prevention policy to the sensitive data.

11. The system of claim 10, wherein the identification module is programmed to identify the subset of data-storage locations on the first computing system that are likely to contain sensitive information by identifying a directory to which an application saves potentially sensitive information.

12. The system of claim 11, wherein the directory is a default directory to which the application automatically saves data.

13. The system of claim 11, wherein:
the application comprises a financial application;
the directory to which the application saves potentially sensitive information is a directory that stores a file of the financial application.

14. The system of claim 11, wherein:
the application comprises an internet browser;

the directory to which the application saves potentially sensitive information is a directory to which the internet browser automatically saves downloads.

15. The system of claim 10, wherein the identification module is programmed to identify the subset of data-storage locations on the first computing system by identifying a network share that is likely to contain sensitive information.

16. The system of claim 10, wherein the identification module is programmed to identify the subset of data-storage locations on the first computing system by:
   performing a full data-loss-prevention scan on the first computing system to identify sensitive information on the first computing system;
   identifying, based on the result of the full data-loss-prevention scan, the subset of data-storage locations on the first computing system that are likely to contain sensitive information.

17. The system of claim 16, wherein performing the full data-loss-prevention scan comprises performing a plurality of full data-loss prevention scans.

18. The system of claim 17, wherein the identification module is programmed to identify the subset of data-storage locations on the first computing system by identifying or more locations to which a user inadvertently stores sensitive information.

19. A non-transitory computer-readable-storage medium comprising one or more computer-executable instructions that, when executed by a computing device, cause the computing device to:
   identify a subset of data-storage locations on a first computing system that are likely to contain sensitive information;
   perform a quick scan on the first computing system by scanning the subset of data-storage locations on the first computing system that are likely to contain sensitive information and not scanning other locations on the first computing system;
   identify a location comprising sensitive data during the quick scan of the first computing system;
   determine, based on an analysis of a plurality of previous scans including the quick scan, that the location has been identified as containing sensitive information in a predetermined number of the previous scans;
   based on the determination, add identification information of the sensitive location to a quick-scan-location identification database that stores identification information of sensitive locations of the first computing system;
   schedule a quick scan to run at regular intervals on a second computing system, wherein running the quick scan of the second computing system comprises:
      scanning a subset of the data-storage locations on the second computing system corresponding to the sensitive locations included in the quick-scan-location identification database;
      excluding, from the quick scan of the second computing system, a subset of data-storage locations corresponding to data-storage locations that are not included in the quick-scan-location identification database.

20. The non-transitory computer-readable-storage medium of claim 19, wherein the one or more computer-executable instructions are programmed to identify the subset of data-storage locations on the first computing system that are likely to contain sensitive information by identifying a directory to which an application saves potentially sensitive information.

* * * * *